US012625662B2

(12) United States Patent
Chang et al.

(10) Patent No.: US 12,625,662 B2
(45) Date of Patent: May 12, 2026

(54) ADJUSTABLE DISPLAY DEVICE

(71) Applicant: GIGA-BYTE TECHNOLOGY CO., LTD., New Taipei City (TW)

(72) Inventors: Kuei-Shan Chang, New Taipei City (TW); Shih-Chieh Chou, New Taipei City (TW); Bo Yang, New Taipei City (TW); Xiang Li, New Taipei City (TW); Chia En Liu, New Taipei City (TW); Hao Kai Huang, New Taipei City (TW); Yu Cheng Liou, New Taipei City (TW)

(73) Assignee: GIGA-BYTE TECHNOLOGY CO., LTD., New Taipei City (TW)

( * ) Notice: Subject to any disclaimer, the term of this patent is extended or adjusted under 35 U.S.C. 154(b) by 0 days.

(21) Appl. No.: 19/071,836

(22) Filed: Mar. 6, 2025

(65) Prior Publication Data

US 2025/0306831 A1      Oct. 2, 2025

(30) Foreign Application Priority Data

Mar. 27, 2024    (TW) .................................. 113111475

(51) Int. Cl.
*G06F 3/14*          (2006.01)
*G06F 3/02*          (2006.01)
(52) U.S. Cl.
CPC .............. *G06F 3/14* (2013.01); *G06F 3/0202* (2013.01)
(58) Field of Classification Search
CPC ..... G06F 3/14; G06F 3/0202; G09G 2320/08; G09G 2354/00; G09G 2370/042; G09G 5/006
See application file for complete search history.

(56) References Cited

U.S. PATENT DOCUMENTS 6,670,964 B1    12/2003   Ward et al.
10,958,983 B1 *  3/2021   Soffer ................... G09G 5/006
(Continued)

FOREIGN PATENT DOCUMENTS

CN          205751481 U       11/2016
CN          107179020 A   *   9/2017   ............. H05B 45/00
(Continued)

OTHER PUBLICATIONS

TW Office Action dated Mar. 14, 2025 as received in Application No. 113111475.

(Continued)

*Primary Examiner* — Amit Chatly
(74) *Attorney, Agent, or Firm* — Maschoff Brennan

(57)          ABSTRACT

A display includes: a memory, a physical switching element and a controller. The memory is configured to store multiple pieces of candidate extended display identification data. The physical switching element is configured to be triggered by external force to generate a first switching signal. The controller is connected to the physical switching element and the memory. The controller is configured to control a displayed screen according to original setting data among the pieces of candidate extended display identification data, and adjust the displayed screen according to target data that is different from the original setting data among the pieces of candidate extended display identification data after receiving the first switching signal.

11 Claims, 5 Drawing Sheets

(56) References Cited

U.S. PATENT DOCUMENTS

| | | | | |
|---|---|---|---|---|
| 2009/0027365 | A1* | 1/2009 | Choi | G09G 5/006 |
| | | | | 345/204 |
| 2009/0058868 | A1* | 3/2009 | Kang | G09G 5/006 |
| | | | | 345/581 |
| 2012/0038655 | A1* | 2/2012 | Kang | G09G 5/006 |
| | | | | 345/530 |
| 2015/0006872 | A1* | 1/2015 | Sonobe | G06F 3/14 |
| | | | | 713/2 |
| 2021/0197084 | A1* | 7/2021 | Huang | A63F 13/422 |
| 2022/0148490 | A1* | 5/2022 | Clark | G06F 3/165 |
| 2022/0199051 | A1 | 6/2022 | Komiyama et al. | |
| 2022/0395747 | A1* | 12/2022 | Yeh | A63F 13/22 |
| 2023/0336806 | A1 | 10/2023 | Lu et al. | |
| 2024/0394000 | A1* | 11/2024 | Kim | G06F 1/263 |

FOREIGN PATENT DOCUMENTS

| | | | | |
|---|---|---|---|---|
| CN | 107179020 | B | | 3/2019 |
| CN | 114286138 | A | | 4/2022 |
| CN | 114765002 | A * | | 7/2022 | G09G 3/20 |
| JP | 2001-184188 | A | | 7/2001 |
| JP | 2002-344902 | A | | 11/2002 |
| JP | 2006-268025 | A | | 10/2006 |
| JP | 2014-514206 | A | | 6/2014 |
| KR | 1020070016876 | A | | 2/2007 |
| KR | 1020140060141 | A | | 5/2014 |
| WO | 2005022504 | A1 | | 3/2005 |

OTHER PUBLICATIONS

JP Office Action dated Sep. 30, 2025 in application No. 2025-030213.

EU Extended European Search Report dated Jul. 25, 2025 in application No. 25159946.0.

KR Office Action dated Jul. 31, 2025 in application No. 10-2025-0023404.

* cited by examiner

ADJUSTABLE DISPLAY DEVICE

CROSS-REFERENCE TO RELATED APPLICATIONS

This non-provisional application claims priority under 35 U.S.C. § 119(a) on Patent Application No(s). 113111475 filed in Republic of China (ROC) on Mar. 27, 2024, the entire contents of which are hereby incorporated by reference.

BACKGROUND

1. Technical Field

This disclosure relates to a display.

2. Related Art

Traditionally, when purchasing a display, user is limited to the original display size and is allowed only one display size. In scenarios where multiple display requirements exist, users need to purchase one or more displays of different sizes to meet various usage needs. For example, to satisfy multimedia need, the user must purchase a large-sized, high-resolution display with a standard refresh rate; to meet gaming need, the user need to purchase a small-sized, low-resolution display with a high refresh rate.

Although current gaming displays provide a "Display Mode" feature that allows the user to adjust the display size, achieving the desired size still requires multiple steps for adjustment, making it difficult to switch quickly between different scenarios.

SUMMARY

Accordingly, this disclosure provides a display.

According to one or more embodiment of this disclosure, a display includes: a memory, a physical switching element and a controller. The memory is configured to store a plurality of pieces of candidate extended display identification data. The physical switching element is configured to be triggered by external force to generate a first switching signal. The controller is connected to the memory and the physical switching element, the controller is configured to control a displayed screen according to original setting data among the plurality of pieces of candidate extended display identification data, and adjust the displayed screen according to target data that is different from the original setting data among the plurality of pieces of candidate extended display identification data after receiving the first switching signal.

In view of the above description, the display according to one or more embodiments of the present disclosure, through the physical switching element, user may switch the display's resolution and screen size with a single button, achieving multifunctionality with a single device. Further, the user is also allowed to focus the screen more within the range of their visual focus. Therefore, when the display is used for gaming, players may gain an advantage in spotting enemies more effectively.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
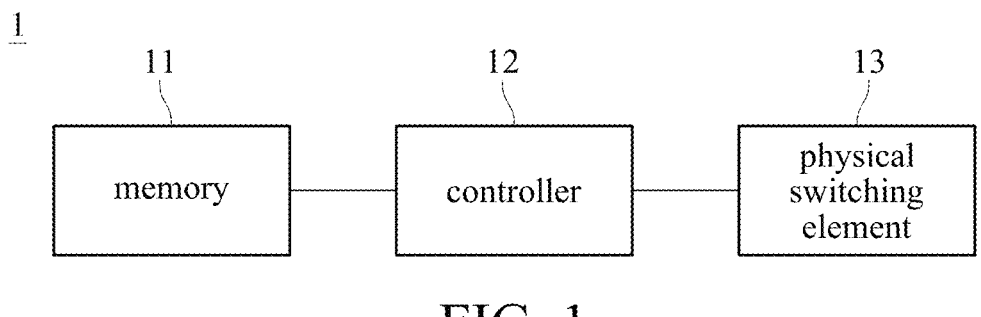
FIG. 1 is a block diagram illustrating a display according to an embodiment of the present disclosure.
Figure 2B:
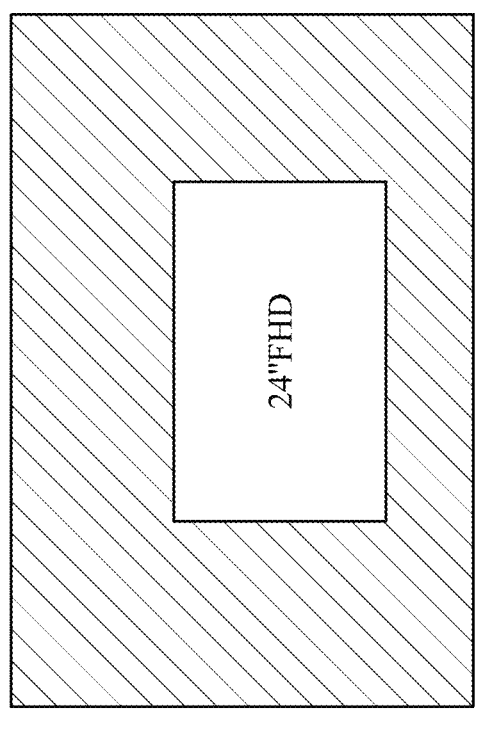
FIG. 2(a) and FIG. 2(b) are schematic diagrams illustrating different screen sizes according to an embodiment of the present disclosure.
Figure 2A:
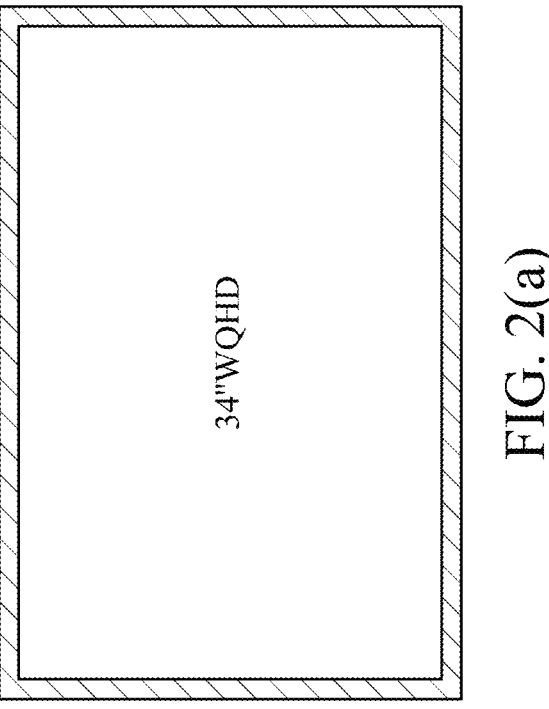

Please refer to FIG. 1 and FIG. 2(a) and FIG. 2(b), wherein FIG. 1 is a block diagram illustrating a display according to an embodiment of the present disclosure, and FIG. 2(a) and FIG. 2(b) are schematic diagrams illustrating different screen sizes according to an embodiment of the present disclosure. In FIG. 2(a) and FIG. 2(b), the white (blank) area represents the displayed screen, and the hatched area represents non-displayed screen. As shown in FIG. 1, the display 1 includes a memory 11, a controller 12 and a physical switching element 13. The controller 12 may be a scaler or a microcontroller etc. The memory 11 is connected to the controller 12, and the controller 12 is connected to the physical switching element 13.

Figure 3:
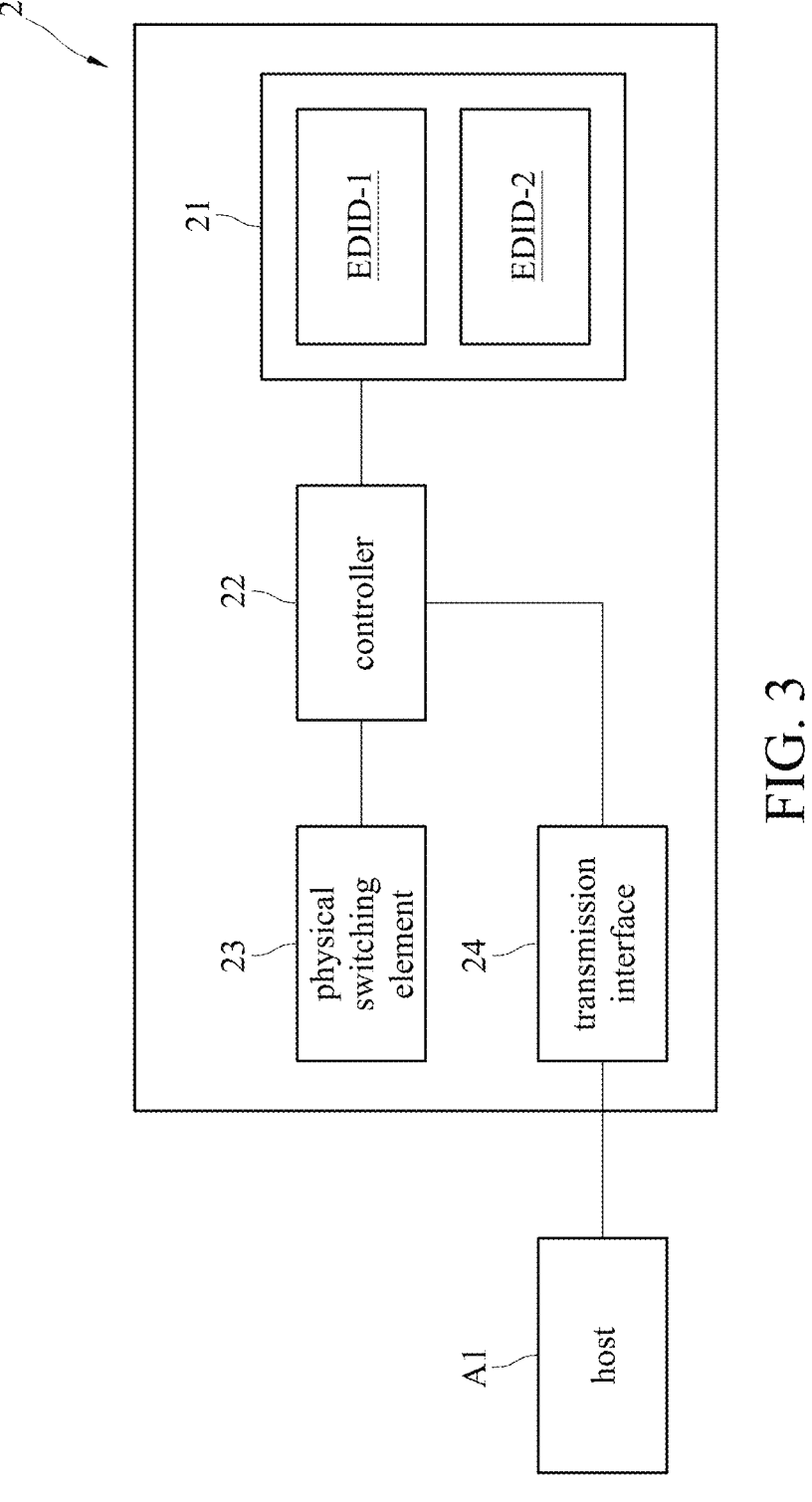
FIG. 3 is a block diagram illustrating a display according to another embodiment
of the present disclosure.

The memory 11 may be located inside of the display 1 and configured to store a plurality of pieces of candidate extended display identification data (EDID) adapted for the display 1 (for example, first extended display identification data EDID-1 and second extended display identification data EDID-2 as shown in FIG. 3). The number of the pieces of candidate extended display identification data may be two or more than two. The memory 11 may be a read-only memory (ROM), such as an electrically-erasable programmable read-only memory (EEPROM).

The pieces of candidate extended display identification data may be different from each other. The candidate extended display identification data may include different resolutions. For example, the candidate extended display identification data may include quad high definition (QHD) resolution, wide quad high definition (WQHD) resolution, full high definition (FHD) resolution and ultra high (UH) resolution etc.

In addition, the candidate extended display identification data may include different screen sizes. The lengths of the screen sizes may be different from each other, the widths of the screen sizes may be different from each other, and the screen sizes may have a same height-to-width ratio, such that the displayed screen may be proportionally scaled. For example, one of the pieces of candidate extended display identification data may include a screen size of 34 inches as shown in FIG. 2(*a*), and another one of the pieces of candidate extended display identification data may include a screen size of 24 inches as shown in FIG. 2(*b*). Further, one of the pieces of candidate extended display identification data (referred to as "first extended display identification data") may include WQHD resolution and the screen size of 34 inches, and another one of the pieces of candidate extended display identification data (referred to as "second extended display identification data") may include FHD resolution and the screen size of 24 inches.

The controller 12 is configured to control the displayed screen of the display 1 according to the original setting data among the candidate extended display identification data stored by the memory 11. Further, after receiving a first switching signal from the physical switching element 13, the controller 12 adjusts the displayed screen of the display 1 according to target data, among the candidate extended display identification data, that is different from the original setting data. As described above, the number of the pieces of candidate extended display identification data may be two, the pieces of candidate extended display identification data include the first extended display identification data and the second extended display identification data. The original setting data may be one of the first extended display identification data and the second extended display identification data, and the target data may be the other one of the first extended display identification data and the second extended display identification data. For example, the original setting data of the display 1 is the first extended display identification data, and the display 1 displays an image content with WQHD resolution and the screen size of 34 inches. After receiving the first switching signal from the physical switching element 13, the display 1 displays the image content with FHD resolution and the screen size of 24 inches.

In addition, when the number of the pieces of candidate extended display identification data is more than two, the original setting data may be one of the pieces of candidate extended display identification data, and the target data may be another one of the candidate extended display identification data. In other words, when the number of the pieces of candidate extended display identification data is two, the controller 12 switches between the two pieces of candidate extended display identification data based on the first switching signal; and when the number of the pieces of candidate extended display identification data is more than two, the controller 12 cycles through the multiple candidate extended display identification data based on the first switching signal.

The physical switching element 13 may be located on an outer shell of the display 1 and includes a switch (a physical button), and the memory 11 and the controller 12 may be located inside the outer shell. The physical switching element 13 is configured to be triggered by external force to generate the first switching signal. In other words, a user may apply pressure to the physical switching element 13 for the physical switching element 13 to generate the first switching signal.

Through the physical switching element, user may switch the display's resolution and screen size with a single button, achieving multifunctionality with a single device. Further, the user is also allowed to focus the screen more within the range of their visual focus. Therefore, when the display is used for gaming, players may gain an advantage in spotting enemies more effectively.

In addition, the display according to one or more embodiments of the present disclosure may be added with a plurality of pieces of new extended display identification data by updating a firmware. Specifically, the memory 11 may store the firmware, and the pieces of candidate extended display identification data are included in the firmware. When the firmware is updated, the plurality of pieces of new extended display identification data may be added to the firmware.

Please refer to FIG. 3, wherein FIG. 3 is a block diagram illustrating a display according to another embodiment of the present disclosure. As shown in FIG. 3, the display 2 includes a memory 21, a controller 22, a physical switching element 23 and a transmission interface 24. The memory 21 is connected to the controller 22, and the controller 22 is connected to the physical switching element 23 and the transmission interface 24. The transmission interface 24 is configured to connect the display 2 to a host A1. The memory 21, the controller 22 and the physical switching element 23 may be the same as the memory 11, the controller 12 and the physical switching element 13 described with reference to FIG. 1, respectively, their details are not repeated herein. The transmission interface 24 may include at least one of a connection port of high-definition multimedia interface (HDMI) and a display port (DP).

In an embodiment, after receiving the first switching signal, the controller 22 may set the first extended display identification data EDID-1 or the second extended display identification data EDID-2 as the extended display identification data provided to an image output end (host A1) according to the selected resolution and screen size selected by the user using the physical switching. Then, the controller 22 may change a voltage level of a hot plug detect (HPD) signal and output the HPD signal with the changed voltage level to the host Al through the transmission interface 24. When the image output end (host A1) detects the HPD signal with the changed voltage level, the image output end (host A1) requests to read the extended display identification data from the display 2. Once the image output end (host A1) successfully reads the format of the extended display identification data, the image output end (host A1) outputs an image based on the specified resolution. In other words, the controller 22 may use the HPD signal to recommunicate with the image output end (host A1) to request the image output end (host A1) to provide image signal again for the target data, and the display 1 may display the displayed screen corresponding to the target data based on the image signal received through the transmission interface 24.

In an embodiment, the controller 22 may output a reminder screen after receiving the first switching signal for the display 2 to display the reminder screen. The controller 22 may adjust the displayed screen according to the target data after receiving a confirmation signal associated with the reminder screen. The reminder screen may include a reminder text and a confirmation button, wherein the reminder text may be used to remind the user to confirm whether to switch the original setting data into the target data, and the confirmation button may generate the confirmation signal after being triggered (clicked). With the mechanism described above, the issue of mistriggering the physical switch and incorrectly switching the extended display identification data (EDID) may be avoided.

Figure 4:
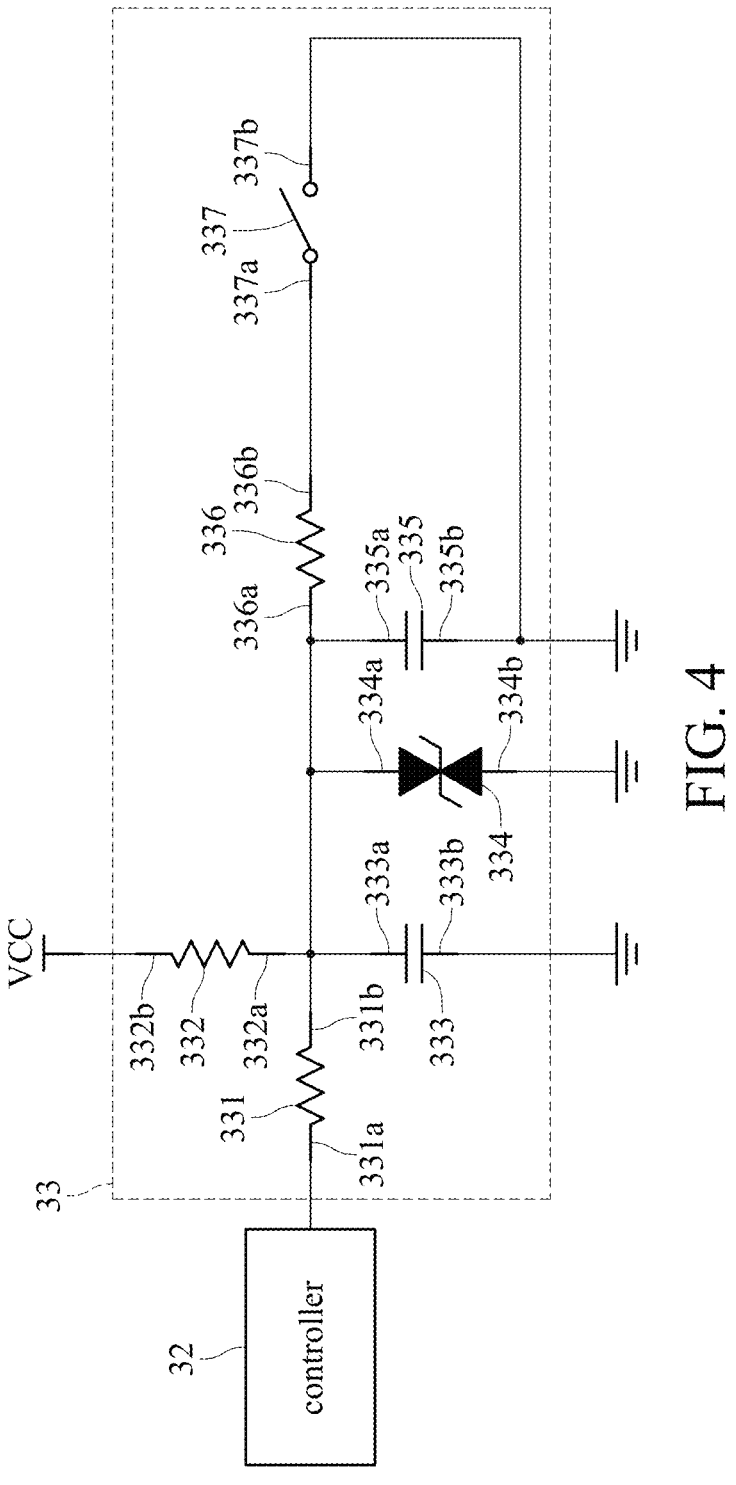
FIG. 4 is a circuit diagram illustrating a physical switch according to another embodiment of the present disclosure.

Please refer to FIG. 4, wherein FIG. 4 is a circuit diagram illustrating a physical switch according to another embodiment of the present disclosure. It should be noted that the physical switching element shown in FIG. 1, FIG. 3 and FIG. 5 may be implemented with the physical switching element 33 shown in FIG. 4. As shown in FIG. 4, the controller 32 is connected to the physical switching element 33. The physical switching element 33 may include a first resistor 331, a second resistor 332, a first capacitor 333, a transient-voltage-suppression (TVS) diode 334, a second capacitor 335, a third resistor 336 and a switch 337.

The first resistor 331 has a first terminal 331*a* and a second terminal 331*b,* and the first terminal 331*a* is connected to the controller 32. The physical switching element 33 may be connected to a general purpose input/output (GPIO) pin of the controller 32 through the first terminal 331*a* of the first resistor 331. The controller 32 may use the change of the voltage level of the GPIO pin as the first switching signal.

The second resistor 332 has a first terminal 332*a* and a second terminal 332*b.* The first terminal 332*a* of the second resistor 332 is connected to the second terminal 331*b* of the first resistor 331, and the second terminal 332*b* of the second resistor 332 is connected to a voltage source VCC.

The first capacitor 333 has a first terminal 333*a* and a second terminal 333*b.* The first terminal 333*a* of the first capacitor 333 is connected to the first terminal 332*a* of the second resistor 332, and the second terminal 333*b* of the first capacitor 333 is grounded.

The TVS diode 334 has a first terminal 334*a* and a second terminal 334*b.* The first terminal 334*a* of the TVS diode 334 is connected to the first terminal 333*a* of the first capacitor 333, and the second terminal 334*b* of the TVS diode 334 is grounded.

The second capacitor 335 has a first terminal 335*a* and a second terminal 335*b.* The first terminal 335*a* of the second capacitor 335 is connected to the first terminal 334*a* of the TVS diode 334, and the second terminal 335*b* of the second capacitor 335 is grounded.

The third resistor 336 has a first terminal 336*a* and a second terminal 336*b.* The first terminal 336*a* of the third resistor 336 is connected to the first terminal 335*a* of the second capacitor 335.

The switch 337 has a first terminal 337*a* and a second terminal 337*b.* The first terminal 337*a* of the switch 337 is connected to the second terminal 336*b* of the third resistor 336, and the second terminal 337*b* of the switch 337 is connected to the second terminal 335*b* of the second capacitor 335. In other words, the second terminal 337*b* of the switch 337 is grounded.

In FIG. 4, when the switch 337 is opened and the physical switching element 13 is triggered by external force, the switch 337 is closed for the second terminal 336*b* of the third resistor 336 to be electrically connected to the second terminal 335*b* of the second capacitor 335, and therefore, the potential of the GPIO pin of the controller 32 is switched from a high potential to a low potential, thereby generating the first switching signal.

Figure 5:
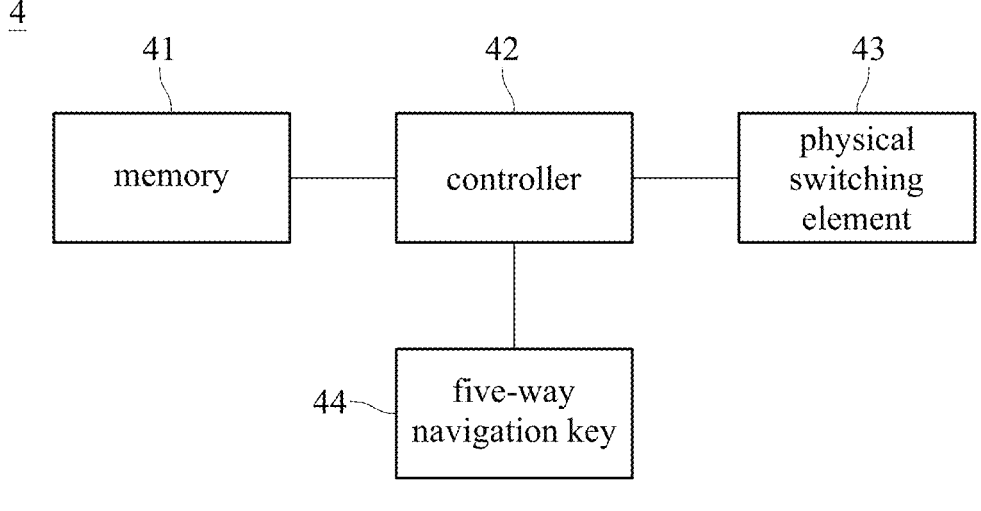
FIG. 5 is a block diagram illustrating a display according to yet another embodiment of the present disclosure.

Please refer to FIG. 5, wherein FIG. 5 is a block diagram illustrating a display according to yet another embodiment of the present disclosure. As shown in FIG. 5, the display 4 includes a memory 41, a controller 42, a physical switching element 43 and a five-way navigation key 44. The memory 41 is connected to the controller 42, and the controller 42 is connected to the physical switching element 43 and the five-way navigation key 44. The memory 41, the controller 42 and the physical switching element 43 may be the same as the memory 11, the controller 12 and the physical switching element 13, respectively, of one or more embodiments described with reference to FIG. 1 and FIG. 3, and their details are not repeated herein.

The five-way navigation key 44 may be located on the outer shell of the display 4 and may be a physical button. The five-way navigation key 44 is configured to be triggered by external force to generate a second switching signal. The controller 42 may be further configured to set a target position among candidate screen positions as a default location according to the second switching signal to control the displayed location of the displayed screen. In other words, the five-way navigation key 44 may be used by the user to control and select various settings of the display 4 on the on-screen display (OSD) displayed by the display 4. For example, the displayed location of the displayed screen may be set. With the above setting, when the physical switching element 43 is triggered for the controller 42 to adjust the resolution of the displayed screen according to the target data of the first switching signal, the displayed screen of the display 4 displays the adjusted displayed screen based on the default location.

The candidate screen positions are different from each other. The candidate screen positions may include bottom-aligned position, center-aligned position, and top-aligned position relative to the top and bottom edges of the display 4. Additionally, the candidate screen positions may further include left-aligned position, center-aligned position, and right-aligned position relative to the left and right edges of the display 4. Furthermore, one of the candidate screen positions may include center-aligned position and bottom-aligned position, while another candidate screen position may include center-aligned position and middle-aligned position. Therefore, after the displayed screen is projected onto the display 4, the display position of the screen on the screen may be adjusted.

In view of the above, the display according to one or more embodiments of the present disclosure, through the physical switching element, user may switch the display's resolution and screen size with a single button, achieving multifunctionality with a single device. Further, the user is also allowed to focus the screen more within the range of their visual focus. Therefore, when the display is used for gaming, players may gain an advantage in spotting enemies more effectively. The display according to one or more embodiments of the present disclosure may be added with multiple pieces of new extended display identification data by updating firmware. With the mechanism of the reminder screen, the issue of mistriggering the physical switch and incorrectly switching the extended display identification data (EDID) may be avoided. Further, through the position switch element (five-way navigation key), after the displayed screen is projected onto the display, the display position of the screen may be adjusted.

What is claimed is:

1. A display, comprising:

a memory configured to store a plurality of pieces of candidate extended display identification data;

a physical switching element configured to be triggered by external force to generate a first switching signal; and a controller connected to the memory and the physical switching element, the controller configured to control a displayed screen according to original setting data among the plurality of pieces of candidate extended display identification data, and adjust the displayed screen according to target data that is different from the original setting data among the plurality of pieces of candidate extended display identification data after receiving the first switching signal, and wherein the controller is configured to change a voltage level of a hot plug detect signal based on the target data, output the hot plug detect signal with the changed voltage level to an image output end, and output the target data to the image output end when receiving a request for reading identification data corresponding to the hot plug detect signal from the image output end.

2. The display according to claim 1, wherein the physical switching element is connected to a general-purpose input/output pin of the controller, and the controller is configured to use a change of a voltage level of the general-purpose input/output pin as the first switching signal.

3. The display according to claim 1, wherein the physical switching element comprises:

a first resistor having a first terminal and a second terminal, the first terminal connected to the controller;

a second resistor having a first terminal and a second terminal, the first terminal of the second resistor connected to the second terminal of the first resistor, and the second terminal of the second resistor connected to a voltage source;

a first capacitor having a first terminal and a second terminal, the first terminal of the first capacitor connected to the first terminal of the second resistor, and the second terminal of the first capacitor grounded;

a transient-voltage-suppression diode having a first terminal and a second terminal, the first terminal of the transient-voltage-suppression diode connected to the first terminal of the first capacitor, and the second terminal of the transient-voltage-suppression diode grounded;

a second capacitor having a first terminal and a second terminal, the first terminal of the second capacitor connected to the first terminal of the transient-voltage-suppression diode, and the second terminal of the second capacitor grounded;

a third resistor having a first terminal and a second terminal, the first terminal of the third resistor connected to the first terminal of the second capacitor; and a switch having a first terminal and a second terminal, the first terminal of the switch connected to the second terminal of the third resistor, and the second terminal of the switch connected to the second terminal of the second capacitor.

4. The display according to claim 1, wherein the controller is configured to output a reminder screen after receiving the first switching signal, and adjust the displayed screen according to the target data after receiving a confirmation signal associated with the reminder screen.

5. The display according to claim 1, further comprising:

a five-way navigation key connected to the controller, the five-way navigation key triggered by external force to generate a second switching signal, wherein the controller is further configured to set a target position among a plurality of candidate screen positions as a default location according to the second switching signal.

6. The display according to claim 1, wherein the plurality of pieces of candidate extended display identification data comprise a wide quad high definition resolution and a full high definition resolution.

7. The display according to claim 1, wherein the plurality of pieces of candidate extended display identification data correspond to different screen sizes.

8. The display according to claim 1, wherein the plurality of pieces of candidate extended display identification data are included in a firmware, and a plurality of pieces of new extended display identification data are added to the firmware when the firmware is updated.

9. The display according to claim 1, wherein the controller is a scaler.

10. The display according to claim 1, wherein the plurality of pieces of candidate extended display identification data are first extended display identification data and second extended display identification data, the original setting data is one of the first extended display identification data and the second extended display identification data, and the target data is the other one of the first extended display identification data and the second extended display identification data.

11. The display according to claim 1, wherein a number of the plurality of pieces of candidate extended display identification data is more than two, the original setting data is one of the plurality of pieces of candidate extended display identification data, and the target data is the other one of the plurality of pieces of candidate extended display identification data.

* * * * *